July 3, 1934.  A. KLINCKMANN  1,964,952
METAL COUPLING TO JOIN DIFFERENT GLASSES
Filed Feb. 1, 1932
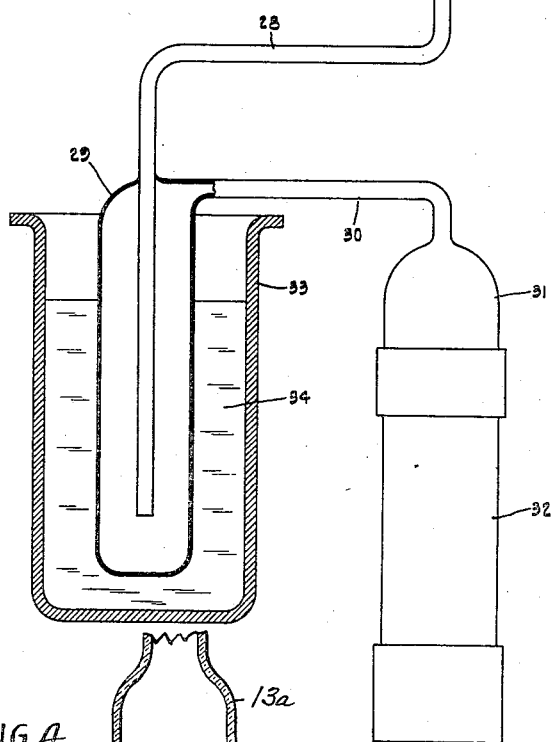
INVENTOR
ARTHUR KLINCKMANN
BY
ATTORNEY Patented July 3, 1934

1,964,952

UNITED STATES PATENT OFFICE 1,964,952

METAL COUPLING TO JOIN DIFFERENT GLASSES

Arthur Klinckmann, Lombard, Ill., assignor to General Electric X-Ray Corporation, Chicago, Ill., a corporation of New York Application February 1, 1932, Serial No. 590,103

4 Claims. (Cl. 250—27.5)

The present invention relates to a process and means for joining glasses of different characters or types.

In X-ray tubes, it is sometimes desirable to use a so-called "soft" glass; that is, a lime, lead, cerium or similar glass. This desirability is occasioned by certain of its physical properties.

In an evacuation system for the X-ray tube, however, it is essential that a hard glass, such as the glass variously designated by the trade-marks "Pyrex" and "Nonex", and other similar glasses of the borosilicate series, be employed. Such a hard glass as this is the only type which will permit of the employment of liquid air in temperature traps which are an essential part of an efficient evacuation system.

The "soft" glasses mentioned above have an expansion coefficient much greater than that of the "hard" glasses and it has been practically impossible to seal one to the other without some intermediate device. This has been done heretofore by the use of the so-called graded seals which are made by sealing glasses of gradually changing temperature coefficients, one to another, so as to provide a compound seal whereby there is between the edges of the hard and soft glass a material made of different glasses of changing hardness or of different temperature coefficients to reduce the wide variation in expansion characteristics between the hard and the soft glass.

By properly proportioning and selecting the various glasses used, it has been possible to obtain a seal in which the amount of strain between the hard and soft glass has been sufficiently low to prevent cracking. Such seals, however, have been mechanically weak. Under actual production precesses, such seals have proven to be extremely short-lived. Pin holes and cracks have formed therein after short use. This mechanical weakness has been due, probably, to the fact that the different glasses had to be worked considerably in order to produce the joint section.

In this way, a certain amount of devitrification has occurred which decomposition or weakening was further expedited by the changes in temperature and pressure to which the glass was subjected when used in the evacuating system. These difficulties are all overcome by the device herein shown.

Primarily, the device here illustrated and described consists of mechanically uniting the metal portions of glass-to-metal seals on the two types of glasses which are to be joined together.

An object of the present invention is to provide an economical and efficient method for joining glasses of different coefficients of expansion.

It is another object of the present invention to provide a means for joining glasses of different coefficients of expansion, said means being of a more permanent nature than any known or used heretofore.

It is another object of the present invention to adjoin in a permanent and efficacious manner hollow glass tubes, adjacent tubes being of different characters and having unequal coefficient of expansion.

Another object of the present invention is to provide a simple means for adjoining glasses of different expansive characteristics, such means requiring a minimum of working of the glass elements.

These and other desirable objects will be made apparent in the following description where like reference characters designate similar parts as set forth in the accompanying drawing hereby made a part of this specification and comprising a single sheet in which:

Figure 1 is an enlarged longitudinal sectional view of one embodiment of the invention;

Figure 2 is a schematic drawing showing a practical application of the invention as employed in the evacuation of an X-ray tube;

Figure 3 is a view of a different form of the invention taken in longitudinal section; and Figure 4 is an enlarged diametric section of the joint shown in Figure 1.

The reference numeral 10 indicates a thimble of any material suitable for the purpose of joining a soft glass to metal, as, for instance, nickel steel copper plated. Said thimble 10 has, at its end of smaller diameter an opening 11. The other end 12 of the thimble 10 is turned down or otherwise treated or shaped to form a tapered edge 13, the edge being in this case approximately .004 inch in thickness. To the tapered edge 13, a joint is made to the soft glass tube 13a by fusing the said tapered edge into the walls of the tube in accordance with the usual practice.

A second thimble 14 of a nickel steel comprising approximately forty-two per cent nickel is mechanically secured so as to form a vacuum type joint to the thimble 10. This joinder may be accomplished in any desired manner as, by means of a silver solder indicated at 15, or by copper brazing, or by other satisfactory method. The outer end 16 of the thimble 14 is turned down to present an edge of approximately .0015 inch, which has proven to be the best thickness suited to a hard glass of the boro-silicate type. After the end 16 is thus prepared, a hard glass tube 17a is attached in accordance with the practice described in the copending application, serially numbered 566,684, by Joseph M. Gosling, entitled Seal for glass and metal and filed October 3, 1931.

The tapered end 16 of the thimble 14 is secured in the end wall of the hard glass tube in the same manner as the edge 13 of the thimble 10. The seal of the thimble to the hard glass tube thus had depends upon its effectiveness upon the proper ratio of the nickel to steel in the thimble, the shape of the thimble and the thickness of the tapered edge.

One method for using the joint just described is illustrated in Figure 2, in which 20 is an X-ray tube to be evacuated. The tube 20 has an anode 21, a cathode 22, and a bulb 23. A tubular projection 24 generally called the "seal-off" is sealed onto the bulb 20 to form a conduit for exhausting the tube. The extended end 25 of the member 24 is enlarged and sealed about the tapered edge 13 of a thimble 10 in the usual manner for soft glass to metal seals. Any ordinary soft glass may be the body of the tubulation 24.

The whole joint is indicated by the reference character 26. The opposite part of the joint 26 comprises a nickel steel thimble 14 of forty-two per cent nickel which is sealed to a tube 28 forming a part of the tube exhausting system. The exhaust system, in addition to the hard glass tube 28, includes a temperature trap 29. An enlarged portion 27 of the tube 28 is identical in diameter to the reduced edge of the end 16 of thimble 14. Fusion of the walls of the enlarged tube end 27 makes it possible for those walls to engulf the thimble end wall in the structure therebetween.

Another tube, 30, connects a temperature trap 29 to a bell jar 31, which in turn is sealed to the opening of a mercury vacuum pump 32. Surrounding the temperature trap 29 is a Dewar bulb 33, containing liquid air 34. The liquid air 34 surrounding the temperature trap prevents the diffusion of mercury vapor from the vacuum pump into the bulb 23.

If a soft glass is used for the manufacture of the trap 29, its life will be relatively short; usually a period of not greater than two days, because of the very low temperature at which the surface of the glass is kept by the liquid air. Such temperature generally causes cracking in soft glass. In order to increase the life of such a temperature trap, a hard glass is used, thus making it necessary that a joint be made between the soft glass tube 24 and the hard glass evacuation system. If desired the entire system, with the exception of the trap 29, may be made of soft glass. This arrangement would necessitate two joints for a hard to a soft glass, one on either opening of the trap.

Although a method for joining soft glasses to borosilicate glasses has been described, and by which method the objections and difficulties of the methods heretofore used have been overcome, it is not intended to limit the invention to the types of glasses suggested. It is not difficult to arrange the seals in such fashion as to permit the joining of any types of glasses, the only limiting factor being that the melting point of the glass be lower than that of the metal parts for the seal.

In Figure 3, there is illustrated a joint for connecting a soft glass tube 40 to a hard glass tube 41. A single cylindrical sleeve 42 is employed instead of two metal thimbles as previously described. The tubular sleeve 42 is prepared from a nickel steel alloy of forty-two per cent nickel. It has at the end for adjoining the soft glass tube a tapered edge 43 approximating .004 inch in thickness, and at the opposite end a tapered edge 44 of approximately .0015 inch in thickness for unison with the hard glass tube.

What is claimed as new and desired to secure by Letters Patent in the United States, is:

1. A metal joint between spaced apart cylindrical walls of hard and soft glasses, said glasses having different coefficients of expansion, said joint comprising two sleeve members each having an end in which the material thereof is tapered in the direction of the edge thereof, the first of said members having a greater thickness of material in its tapered edge than the second of said members, the tapered end of the first of said members being sealed into the wall of glass having the greater coefficient of expansion, the tapered end of the second of said members being sealed into the wall of glass having the smaller coefficient of expansion, and the two sleeve members being united at their untapered ends.

2. A metal joint between spaced apart cylindrical walls of hard and soft glasses, said glasses having different coefficients of expansion, said joint comprising two truncated coniform sleeves of metal, the diameter of one base of each thereof being equal to the diameter of one of said cylindrical walls, the material of one of the bases of each said sleeve being tapered in the direction of the edge thereof, said tapered edge of one of said sleeves having a greater thickness of material therein than the corresponding tapered edge of the other of said sleeves, the tapered edge of the first of said sleeves being sealed into the wall of glass having the greater coefficient of expansion, the tapered edge of the other of said sleeves being sealed into the wall of glass of smaller coefficient of expansion, and the two sleeves being united at their untapered ends.

3. A metal joint between spaced apart cylindrical walls of hard and soft glass respectively, said soft glass having a greater coefficient of expansion than said hard glass, said joint comprising a sleeve member of nickel steel and having an end in which the material thereof is tapered in the direction of the edge thereof, a second sleeve member of nickel steel composed of approximately forty-two per cent nickel and having an end in which the material thereof is tapered in the direction of the edge thereof to a thickness of approximately fifteen ten thousandths of an inch, said first sleeve member having the tapered end thereof sealed into said wall of soft glass and said second sleeve member having the tapered end thereof sealed into said wall of hard glass, and said sleeve members being united at their untapered ends.

4. A metal joint between spaced apart cylindrical walls of hard and of soft glass, respectively, said soft glass having a greater coefficient of expansion than said hard glass, said joint comprising a hollow member of nickel steel having opposed openings at the ends thereof and an annular tapered edge about one of said openings, a second hollow member of nickel steel having approximately forty-two per cent nickel therein and having opposed openings at the ends thereof and an annular tapered edge approximately fifteen ten thousandths of an inch in thickness about one of said openings, said first member having said tapered edge thereof sealed into the end of said cylindrical wall of soft glass, said second member having said tapered edge thereof sealed into the end of said cylindrical wall of hard glass, and said hollow members of nickel steel having the untapered edges thereof united to form a tube between said parts of hard and of soft glass.

ARTHUR KLINCKMANN.